United States Patent
Anderson et al.

(10) Patent No.: US 12,209,208 B2
(45) Date of Patent: Jan. 28, 2025

(54) WOOD ADHESIVE COMPOSITIONS COMPRISING PROTEINS AND POLY (GLYCIDYL ETHER), AND USES THEREOF

(71) Applicant: CARGILL, INCORPORATED, Wayzata, MN (US)

(72) Inventors: Kevin R. Anderson, Cedar Rapids, IA (US); James Michael Wescott, Minocqua, WI (US)

(73) Assignee: CARGILL, INCORPORATED, Wayzata, MN (US)

( * ) Notice: Subject to any disclaimer, the term of this patent is extended or adjusted under 35 U.S.C. 154(b) by 855 days.

(21) Appl. No.: 17/215,891

(22) Filed: Mar. 29, 2021

(65) Prior Publication Data

US 2021/0214595 A1    Jul. 15, 2021

Related U.S. Application Data

(63) Continuation of application No. 16/098,668, filed as application No. PCT/US2017/031332 on May 5, 2017, now Pat. No. 10,961,421.

(60) Provisional application No. 62/332,256, filed on May 5, 2016.

(51) Int. Cl.
| | |
|---|---|
| C09J 189/00 | (2006.01) |
| B32B 9/04 | (2006.01) |
| B32B 21/00 | (2006.01) |
| B32B 21/02 | (2006.01) |
| B32B 21/04 | (2006.01) |
| B32B 21/08 | (2006.01) |
| B32B 27/38 | (2006.01) |
| C08H 1/00 | (2006.01) |
| C09J 5/06 | (2006.01) |
| C09J 163/00 | (2006.01) |

(52) U.S. Cl.
CPC ............. *C09J 189/00* (2013.01); *B32B 9/042* (2013.01); *B32B 21/00* (2013.01); *B32B 21/02* (2013.01); *B32B 21/04* (2013.01); *B32B 21/08* (2013.01); *B32B 27/38* (2013.01); *C08H 1/00* (2013.01); *C09J 5/06* (2013.01); *C09J 163/00* (2013.01); *C09J 2400/303* (2013.01); *C09J 2489/00* (2013.01)

(58) Field of Classification Search
None
See application file for complete search history.

(56) References Cited

U.S. PATENT DOCUMENTS

| | | | |
|---|---|---|---|
| 1,703,134 A | 2/1929 | Bradshaw | |
| 1,724,695 A | 8/1929 | Davidson | |
| 1,813,387 A | 7/1931 | Davidson | |
| 1,994,050 A | 3/1935 | Satow | |
| 2,848,342 A * | 8/1958 | Atkinson, Jr. | A23J 3/346 106/155.21 |
| 2,882,250 A * | 4/1959 | Baker | C09J 189/00 524/21 |
| 3,192,171 A * | 6/1965 | Lambuth | C09J 189/00 523/424 |
| 3,347,688 A * | 10/1967 | Frankenfeld | C12N 1/28 435/259 |
| 3,836,376 A | 9/1974 | Hampton | |
| 4,076,846 A | 2/1978 | Nakatsuka | |
| 4,272,295 A | 6/1981 | Linke | |
| 5,316,578 A | 5/1994 | Buehler | |
| 5,362,777 A | 11/1994 | Tomka | |
| 5,405,564 A | 4/1995 | Stepto | |
| 5,660,900 A | 8/1997 | Andersen | |
| 6,136,097 A | 10/2000 | Lorcks | |
| 6,168,857 B1 | 1/2001 | Andersen | |
| 6,231,970 B1 | 5/2001 | Andersen | |
| 6,844,380 B2 | 1/2005 | Favis | |
| 7,060,798 B2 | 6/2006 | Li | |
| RE39,339 E | 10/2006 | Andersen | |
| 7,252,735 B2 | 8/2007 | Li | |
| 2005/0004309 A1 | 1/2005 | Gerst | |
| 2006/0128889 A1 | 6/2006 | Mikkonen | |
| 2007/0021534 A1 | 1/2007 | Glenn | |
| 2008/0021187 A1 | 1/2008 | Wescott | |
| 2008/0050602 A1 | 2/2008 | Spraul | |
| 2008/0287592 A1 | 11/2008 | Favis | |
| 2008/0292886 A1 | 11/2008 | Allen | |
| 2009/0098387 A1 * | 4/2009 | Brady | C09J 189/00 427/393 |
| 2009/0142384 A1 | 6/2009 | Muller | |
| 2010/0291822 A1 | 11/2010 | Netravali | |
| 2010/0311874 A1 | 12/2010 | Mentink | |
| 2010/0311905 A1 | 12/2010 | Mentink | |

(Continued)

FOREIGN PATENT DOCUMENTS

| | | |
|---|---|---|
| CN | 105542710 B | 11/2017 |
| EP | 0326517 A1 | 7/1994 |

(Continued)

OTHER PUBLICATIONS

Chen, Minzhi, et al., "Improving Water Resistance of Soy-Protein Wood Adhesive by Using Hydrophilic Additives", BioResources, vol. 10, No. 1, 2015, 41-54.

Huang, Jian, et al., "A new soy flour-polyepoxide adhesive system for making interior plywood", Department of Wood Science and Engineering, Oregon State University, Corvallis, Holzforschung, vol. 66, 2012, 472-431.

(Continued)

*Primary Examiner* — Michael J Feely

(57) ABSTRACT

There is disclosed: a wood adhesive composition comprising a protein and a poly(glycidyl ether); a method for using the wood adhesive composition to make a composite wood product; and composite wood products made using the wood adhesive composition.

19 Claims, No Drawings

(56) References Cited

U.S. PATENT DOCUMENTS

2013/0065012 A1 3/2013 Parker
2015/0267095 A1* 9/2015 Parker .................. D21H 17/15
523/122

FOREIGN PATENT DOCUMENTS

| EP | 1397537 B1 | 1/2008 |
|----|------------|--------|
| EP | 1265957 B1 | 2/2009 |
| EP | 1292639 B1 | 3/2009 |
| GB | 1065015 A | 4/1967 |
| WO | 9319125 W | 9/1993 |
| WO | 2010125490 A2 | 11/2010 |
| WO | 2010131134 A2 | 11/2010 |
| WO | 2012155244 A1 | 11/2012 |
| WO | 2017193015 A1 | 11/2017 |

OTHER PUBLICATIONS

Huang, Jian, et al., "Development and evaluation of new curing agents derived from glycerol for formaldehyde-free soy-based adhesives in wood composites", Holzforschung, vol. 67, Issue 6, Published Online: DOI: https://doi.org/10.1515/hr-2012/0102, Aug. 2013, 659-665.
Jingjing Li et al: Soybean meal-based wood adhesive enhanced by ethylene glycol diglycidyl ether and diethylenetriamine:, Insdustrial Crops and Products, vol. 74, Nov. 1, 2015 (Nov. 1, 2015), pp. 613-618, XP55652509, NL ISSN: 0926-6690, DOI: 10.1016/j.indcrop.2015.05.066.
Kibble, "Meal vs Flour" Mar. 2, 2011 (Mar. 2, 2011); Retrieved on Jul. 6, 2017 (Jul. 6, 2017) from http://perpetulpregaredness.blogspot.com/2011/03/meal-vs-flour.html.
Lei, H., et al., "Cross-linked soy-based wood adhesives for plywood", International Journal of Adhesion and Adhesives, Elsevier, vol. 50. Online: https://doi.org/10.1016/j.iijadhadh.2014.01.026, Apr. 2014, 199-203.
Luo, Jing, et al., "A New Flexible Soy-Based Adhesive Enhanced with Neopentyl Glycol Diglycidyl Ether: Properties and Application", Polymers 2016, 8(9), 346, doi:10.3390/polym8090346.
Wu, Zhigang, et al., "Soy-vased adhesive cross-linked by melamine-glyoxal and epoxy resin", Journal of Adhesion Science and Technology, vol. 30, Issue 19, 2016, 2120-2129.
Zeng, Xiangling, et al., "Aging Resistance Properties of Poplar Plywood Bonded by Soy Protein-Based Adhesives", BioSources, 11(2), 2016, 4332-4341.

* cited by examiner

WOOD ADHESIVE COMPOSITIONS COMPRISING PROTEINS AND POLY (GLYCIDYL ETHER), AND USES THEREOF

CROSS-REFERENCE TO RELATED APPLICATIONS

This application is a Continuation of U.S. patent application Ser. No. 16/098,668, filed Nov. 2, 2018, and entitled WOOD ADHESIVE COMPOSITIONS COMPRISING PROTEINS AND POLY (GLYCIDYL ETHER), AND USES THEREOF, which is a National Phase of International Application No. PCT/US2017/031332, filed May 5, 2017, and entitled WOOD ADHESIVE COMPOSITIONS COMPRISING PROTEINS AND POLY (GLYCIDYL ETHER), AND USES THEREOF, which claims the benefit of U.S. Provisional Patent Application No. 62/332,256, filed on May 5, 2016, and entitled WOOD ADHESIVE COMPOSITIONS COMPRISING PROTEINS AND POLY (GLYCIDYL ETHER), AND USES THEREOF, each of which is hereby incorporated by reference herein in its entirety.

FIELD OF THE DISCLOSURE

The present disclosure is directed to a wood adhesive composition comprising a protein and a poly(glycidyl ether), the process to produce a wood adhesive, uses thereof, and wood composite material made using such wood adhesive compositions.

BACKGROUND

Adhesives compositions have been made using raw materials such as starch, blood and collagen extracts from animal bones and hides, milk protein and fish extracts. However, adhesive compositions made from these materials typically suffer from a number of drawbacks, including lack of durability and poor water resistance.

U.S. Pat. Nos. 1,813,387, 1,724,695 and 1,994,050 describe the use of soy flour for adhesive compositions. However, the soybean adhesives described in these patents exhibit relatively short pot lives and poor water resistance.

Blood protein was utilized in the past to improve the water durability of soy protein based adhesive compositions. However blood protein is expensive and not generally desirable to use in engineered or composite wood products.

Phenol-formaldehyde (PF) and urea-formaldehyde (UF) adhesive resins are commonly utilized in adhesive compositions for use with composite wood products. Composite wood products made using phenol-formaldehyde and modified urea-formaldehyde resins have acceptable water resistance and are dominant in the exterior composite wood market. Urea-formaldehyde based resins are dominant in the interior wood market, but lack hydrolytic stability along the polymer backbone. This causes large amounts of free formaldehyde to be released from the finished composite wood products.

In 1987 the Environmental Protection Agency (EPA) classified formaldehyde as a "Probable Human Carcinogen". In June of 2004, the International Agency for Research on Cancer (IARC) classified formaldehyde as a "Carcinogen to Humans". In June of 2010, the EPA reclassified formaldehyde to a "Known Human Carcinogen". Finally, in June of 2011, the U.S. Department of Health and Human Services listed formaldehyde as a "Known Human Carcinogen" on their "Report of Carcinogens" (ROC).

As a result of these recent carcinogenic "classifications" for formaldehyde, several new and more stringent composite panel emission standards have been developed which limit the emissions of formaldehyde from composite products; including the 2007 California Air Resource Board (CARB) issued "Airborne Toxic Control Measure (ATCM) to Reduce Formaldehyde Emissions from Composite Wood Products" and the similar 2010 National Standard "Formaldehyde Standards for Composite Wood Products" Act" (S-1660).

U.S. Pat. Nos. 7,060,798 and 7,252,735; U.S. Patent Applications 2008/0021187, 2008/0050602 and 2008/0292886 to Li et al. describes adhesive compositions for use in engineered wood products that use proteins, such as soy protein, together with Amine-epichlorohydrin polymers (AE polymers). Composite wood products made using adhesive compositions comprising AE polymers and soy protein have improved water resistance compared to composite wood products made with soy protein alone. However, adhesive compositions comprising AE polymers and proteins generally must be utilized at pH levels at or near neutral conditions to provide reasonable pot life times and this often limits the unfolding of the protein that can be achieved in such a system. Also, adhesive compositions utilizing proteins and AE polymers may produce or contain 1-chloro-2,3-propanediol (CPD) and 1,3-dichloro-2-propanol (DCP), that are both known carcinogens. Although commercially successful, these protein/AE polymer adhesives still suffer from only marginal water resistance and dry bond strength.

SUMMARY OF THE DISCLOSURE

The present application is directed to a wood adhesive composition comprising a protein and a poly(glycidyl ether), methods for making such wood adhesive compositions, methods for using such wood adhesive compositions, and composite wood products made from such adhesive composition. The components of the wood adhesive composition typically are caused to react through the use of heat and/or pressure to form a cured adhesive. Cured refers to a substantial portion of the components of the composition being reacted to allow the composition to adhere to itself and the wood substrate more effectively than the uncured composition. Other mechanisms known to one of skill in the art may be utilized to cure the composition, such as radiation (e.g. ultraviolet light, microwave energy, etc.) or other means such as sonic activation.

The wood adhesive composition is typically an aqueous based composition. The wood adhesive composition may be used in the production of composite wood products such as plywood, particle board, medium density fiber board ("MDF"), high density fiber board ("HDF"), oriented strand board ("OSB"), engineered wood flooring, combinations thereof, and the like.

The protein of the invention preferably is contained in protein flour useful for the invention, such as soy flour, pea flour, wheat flour, corn flour, oat flour, barley flour, rice flour, flaxseed flour, rapeseed flour, cottonseed flour, sunflower seed flour, safflower seed flour, sorghum flour, palm flour, and mixtures thereof. Protein flour that is suitable for use in the inventive adhesive compositions typically is obtained by removing some or most of the oil from a cereal grain or oilseed from which the flour is derived, to yield a residual meal that typically is ground into fine protein flour. Typically, hexane or some other organic solvent is used to extract the majority of the non-polar oils from the material. Typically the extraction is carried out on the crushed cereal grain or oilseed material. Extrusion/extraction methods known to one of ordinary skill in the art of vegetable oil processing may also be utilized to reduce the oil content in the protein flour. The oil level in protein flours, such as soy flour, typically is less than 5 percent by weight, preferably less than 3 percent by weight, more preferably less than 2 percent by weight, and most preferably less than 1 percent by weight of the protein flour.

Due to its ready availability and high protein levels, soy flour is particularly useful in the invention.

In composite wood product applications where higher solids level or lower viscosity level for the solids content are desirable, protein flours that exhibit a lower viscosity for a given solids content may be preferable. Examples of such protein flours include pea flour, wheat flour, corn flour, oats flour, barley flour, rice flour, flaxseed flour, rapeseed flour, cottonseed flour, sunflower seed flour, safflower seed flour, sorghum flour, palm flour, and mixtures thereof. Due to its high protein content pea flour (25 wt % to 55 wt % protein) is preferable for such applications. Examples of end-use application that will benefit from lower viscosities are manufacturing processes where the adhesive is typically sprayed onto the wood substrate during the manufacturing process, such as the manufacturing processes for: particle board, medium density fiber board, high density fiber board, and oriented strand board.

The protein contained in protein flour, such as soy flour, is often denatured to enhance the adhesion of the protein to itself and to the wood substrate and to enhance the reaction of the protein with crosslinking agent. Denaturation refers to the process by which the "natural" configuration and conformation of the protein is lost due to chemical (acids, bases, chaotropic agents, hydrolysis, etc.) or physical (heat, shear, etc.) processes. The properties of protein-containing materials may vary with the amount of denaturing that has occurred. Typically an alkaline agent is utilized in the method for producing the adhesive compositions.

An advantage of the aqueous wood adhesive compositions of the invention is that they can be effectively cured at higher pH's than adhesive compositions made from AE polymers and proteins. For example, the aqueous wood adhesives compositions of the invention can be effectively cured at pH of from 8-13, preferably from 9-12, and more preferably from 9.5 to 11.5. In some instances, aqueous wood adhesive compositions of the invention are raised to pH's greater than 11, for example a pH greater than 12, where the residence time of the adhesive composition at the higher pH prior to application to the wood is not unduly long (e.g. less than 4 hours, preferably less than 2 hours).

The use of higher pH's for the aqueous wood adhesive compositions of the invention, and methods for utilizing these compositions in the manufacture of composite wood products, facilitates greater denaturing of the proteins in the compositions, which will lead to enhanced performance of the wood adhesives in the manufacture of composite wood products and enhanced performance properties of the resulting composite wood products (e.g. greater moisture resistance, and greater dry bond strength).

At pH's above 13, the viscosity of the adhesive composition over time will increase significantly, and may limit the usefulness of the adhesive in the manufacture of composite wood products.

DETAILED DESCRIPTION OF THE DISCLOSURE

The present invention is directed to a wood adhesive composition comprising a protein and a poly(glycidyl ether).

The wood adhesive composition is for use in the production of composite wood products such as plywood, particle board, MDF, HDF, OSB, engineered wood flooring, combinations thereof, and the like.

The protein component of the wood adhesive of this invention may be any protein derived from plant, microbial, or animal sources.

The poly(glycidyl ether) may be any poly(glycidyl ether).

The protein typically comprises from 1% to 99% dry weight of the wood adhesive composition, and the poly (glycidyl ether) in the wood adhesive composition comprises from 1% to 99% dry weight of the wood adhesive composition.

For this invention dry weight refers to a measure of the components of the composition absent water. For example, if the protein comprises 50% dry weight of the wood adhesive composition, then the protein makes up 50% of the composition remaining after any water present in the composition has been excluded from the calculation.

The weight ratio of protein to poly(glycidyl ether) preferably is from 10.5:1 to 2.6:1, and in some instances from 8:1 to 3.1:1.

The wood adhesive composition of this invention preferably comprises a protein unfolding agent. Any known protein unfolding agent may be utilized. Typical unfolding agents include but are not limited to, acids or bases, anionic detergents, cationic detergents, and amino-containing chemicals such as urea and guanidine. Most preferably, bases are used as the unfolding agent of choice.

Wetting agents, such as sodium sulfite and sodium bisulfite may be added to the composition. The wetting agents typically enhance the interaction of the protein with the unfolding agents and shorten the time it takes for the composition to reach the desired viscosity.

The wood adhesive composition of this invention may also comprise a plasticizing agent. Any known plasticizing agents may be used. Typical plasticizing agents utilized include glycerol, propylene glycol, ethylene glycol, alkyl and aryl derivatives of glycerol, propylene glycol or ethylene glycol, carbohydrate sugars and polyols such as glucose, fructose, sorbitol, isosorbide, maltitol, mannitol, and erythrytol. Oligomers and polymers of any of the earlier listed monomers may also be used such as polyglycerols, polyethylene glycol (PEG) polypropylene glycols (PPG), glucose syrups, maltodextrins, dextrins, modified starches, and mixtures thereof. Other non-volatile hydroxylated compounds may also be used as plasticizers.

The Protein:

The protein of this disclosure may be in any form. For example, the protein may be a protein meal, a protein flour, a protein concentrate, a protein isolate, and mixtures thereof.

Preferably, a plant protein is utilized. The plant protein preferably is derived from plant seeds. For example, the plant protein may be derived from cereal grains and oilseeds such as corn, oats, wheat, barley, rice, pea, soybean, flaxseed, rapeseed, cottonseed, sunflower seed, safflower seed, sorghum, palm, and mixtures thereof. Due to its ready availability and high protein content the protein is more preferably derived from soybeans or peas.

Preferably, due to its ready availability, relatively low cost, and ease with which it can be used to form a homogeneous adhesive composition, the plant protein derived from plant seeds is in the form of a protein flour. Soy flour or pea flour are more preferred. Even more preferably, due to its wide availability, soy flour is utilized.

Protein Dispersibility Index (PDI) is a measure of a protein flour's ability to solubilize in aqueous solution. The PDI is determined according to procedure of AOCS Ba 10a-05.

The PDI generally is an indication of the amount of denaturing of the protein in the protein flour and is often related to protein solubility, where the higher the PDL the less denatured the protein and the higher the solubility of the protein. For example, soy flour prepared from typical soy flakes prepared with no or low added heating will have a PDI value greater than 85, and the proteins in the flour prepared from such flakes can be characterized as having low prevalence of denatured proteins. Decreasing values of PDI are associated with an increasing prevalence of denatured protein. For soy flour, in addition to solubility at neutral pH, viscosity, color, and extent of lysine modification vary with the PDI value.

Three grades of commonly available soy flours are 90 PDI (untoasted), 70 PDI (lightly toasted) and 20 PDI (heavily toasted). The PDI of the protein flour typically is from 95 to 10, preferably from 90 to 20, more preferably from 85 to 40. And, in some instances from 90 to 70. Different PDT protein flours may be desirable to modify the rheology, tack or many of several process parameters utilized in the manufacture of wood composite products, such as the ability to spray, roll or form a curtain for applying to the wood substrate. For the final adhesive composition of the invention, in general a protein flour starting with a lower PDI will provide a higher viscosity composition than a protein flour starting with a higher PDI at the same solids incorporation level.

In one aspect, a mixture of a relatively high PDI protein flour (i.e. 60 to 90) with a relatively low PDI protein flour (i.e. 10 to 40) is utilized. For example, a protein flour comprising a mixture of from 10 wt % to 90 wt % protein flour having a PDI from 10 to 40 and from 90 wt % to 10 wt % protein flour having a PDI from 65 to 90. Preferably, the protein flour comprises soy flour. And, more preferably, the mixture comprises from 20 wt % to 80 wt % (for example 40 wt % to 60 wt %) soy flour having a PDI from 15 to 30 and from 80 wt % to 20 wt % (for example 60 wt % to 40 wt %) soy flour having a PDI from 70 to 85.

When protein flour is utilized, the protein flour in the wood adhesive composition comprises from 50% to 96% dry weight of the wood adhesive composition, and the poly(glycidyl ether) comprises from 4% to 50% by dry weight of the composition. Preferably, the protein flour in the wood adhesive composition comprises from 80% to 96% dry weight of the wood adhesive composition, and the poly(glycidyl ether) comprises from 4% to 20% dry weight of the wood adhesive composition. More preferably, the protein flour in the wood adhesive composition comprises from 86% to 95% dry weight of the wood adhesive composition, and the poly(glycidyl ether) comprises from 5% to 14% dry weight of the wood adhesive composition. For adhesive compositions made with protein flour, the weight ratio of protein to poly(glycidyl ether) typically is from 95:5 to 1:1, preferably from 10.5:1 to 2.6:1, and in some instances from 8:1 to 3.1:1. Preferably, the protein flour is a soy flour and/or pea flour comprising from 45% by weight to 60% by weight protein.

Typically, the residual oil in the protein flour is less than 5 percent by weight, preferably less than 3 percent by weight, more preferably less than 2 percent by weight and most preferably less than 1 percent by weight. For soybeans the flour that has been treated to reduce the amount of excess residual oil is typically referred to as "soy flour".

The protein flour typically has between 20 and 80 percent by weight protein, preferably from 25 to 75 percent by weight protein, and more preferably from 35 to 60 percent by weight protein. Soy flour typically has from 45 to 55 percent by weight protein. High protein pea flour, sometimes referred to in the art of protein flours as "modified pea flour" typically has a protein content between 45 to 60 percent by weight protein.

Ground protein flour (such as soy flour) also can be identified by the average size of the flour particles, which is expressed in terms of its Ground Mesh Size and often combined with the protein PDI. For example, a 100/90 Soy Flour is a ground soy flour where 95% of the flour passes through a 100 mesh screen, and has a Protein Dispersibility Index of 90. A 200/20 Soy Protein Flour on the other hand indicates that 95% of the flour passes through a 200 mesh screen, but has only a 20 PDI. The lower PDI value is indicative of a higher level of heat treatment during the manufacture of the flour. The Mesh Size of the soy flour utilized in the invention typically is from 10 to 500, preferably from 50 to 300, and more preferably from 100 to 200.

In addition to the denaturing that may occur during the processing of plant flours (as indicated by a lower value for PDI), during the formation, handling, or use of an aqueous wood adhesive composition the proteins may undergo an unfolding denaturing of the protein polymer. This can occur due to heating during the formation of or use of the aqueous wood adhesive composition. Denaturing of the water dispersed protein polymers can also occur due to high and low pH conditions, high salt concentrations, and through the use of unfolding agents to denature the proteins. Denaturing of the proteins typically increase the viscosity of the aqueous wood adhesive composition above the viscosity that would occur without the denaturing. It is believed that this denaturing through unfolding of the protein polymer will result in a fully-cured composite wood product having greater water resistance than a fully-cured composite wood product that is made with an aqueous wood adhesive composition that does not undergo this additional denaturing.

The Poly(Glycidyl Ether):

The wood adhesive composition of this invention comprise a poly(glycidyl ether) that can be reacted with the protein to form a cured adhesive. The poly(glycidyl ether) is characterized by two or more —methylene epoxide pendant groups (a glycidyl group) on the base carbon as shown below:

Glycidyl-O—X—O-Glycidyl wherein O is oxygen, —O-Glycidyl is a glycidyl ether group; and wherein X can be an alkyl, cycloalkyl, alkenyl, aryl, ether, ester; or an alkyl, cycloalkyl, alkenyl, aryl, ether, polyether, ester or polyester substituted with one or more glycidyl ether groups, and mixtures thereof.

Typically X has at least 2 carbons in a backbone. Preferably, X has from 2 to 30 carbons in a backbone, more preferably 2 to 6 carbons in a backbone, and further more preferably from 4 to 6 carbons in a backbone. The poly (glycidyl ether) may be of a linear structure, a branched structure, or a dendritic structure. Examples of poly(glycidyl ether)s useful for the invention include: polypropylene diglycidyl ether, dipropylene diglycidyl ether, trimethylolethane triglycidyl ether, trimethylolpropane triglycidyl ether, 1,4 butanediol diglcidyl ether, neopentylglycol diglycidyl ether, 1,6 hexanediol diglycidyl ether, cyclohexanedimethanol diglycidyl ether, polyglycol Triepoxide, and mixtures thereof. The poly(glycidyl ether) typically has a molecular weight of less than 3,000 daltons, and preferably a molecular weight of less than 1,000 daltons. Preferably, the poly (glycidyl ether) has a molecular weight of at least 174 daltons. Preferably neopentylglycol diglycidyl ether is utilized.

Reaction of Poly(Glycidyl Ether) and Protein:

The reaction of the poly(glycidyl ether) and protein typically takes place after the aqueous wood adhesive composition has been applied to the wood surfaces to be adhered. It is desirable to reduce chemical reactions taking place between the protein and poly(glycidyl ether) before the aqueous wood adhesive composition comes in contact with the wood. Undesirable reactions between the protein and poly(glycidyl ether) may lead to poor/reduced useful residence time (the "adhesive pot life") that the adhesive composition can be retained in the chemical addition tanks prior to application to the wood substrate and can lead to decreased performance of the adhesive. Surprisingly and unexpectedly, the inventors have discovered that the adhesive composition of the invention has a significantly increased adhesive pot life than adhesive compositions made with vegetable protein, such as soy protein, and AE polymers at the same pH.

Typically, a pH basic activating agent is included within the wood adhesive composition to enhance the reaction of protein and glycidyl ether during the curing of the composite wood product. The poly(glycidyl ether) and protein once cured form a cross-linked polymeric network that adhere the surfaces of the wood in the composite product to each other. Typically the pH of the wood adhesive composition is from 8-13, preferably from 9-12, and more preferably from 9.5 to 11.5 during or immediately prior to or during the curing step. In some instances, aqueous wood adhesive compositions exhibit pH's greater than 11, for example a pH greater than 12 immediately prior to or during the curing step when the adhesive pot life is not unduly long (e.g. less than 4 hours, preferably less than 2 hours). The basic activating agent may be in dry or liquid form, and may contain alkali earth metal salts such as oxides, hydroxides, carbonates, phosphates, sulfates, sodium silicate, mixtures thereof, and the like. The basic activating agent may also be amine reagents such as ammonia, primary amines, secondary amines, tertiary amines, mixtures thereof. It is desirable to raise the pH of the wood adhesive composition to from pH 8 to about pH 13 in order to activate the crosslinking of the protein during curing. More preferably, the pH of the wood adhesive composition is raised to between pH 9 to pH 12. Most preferably, the pH of the wood adhesive composition is raised to between pH 9.5 to pH 11.5. The base may be added to the wood adhesive at any step in the process including before, during or after being applied to the wood substrate. Preferably, the base is added to the wood adhesive composition prior to the adhesive composition being applied to the wood. While not desiring to be bound by theory, it is believed that adding the base prior to the wood adhesive composition being applied to the wood facilitates the denaturing of the protein before it is reacted with the poly (glycidyl ether).

In an aspect, the protein (such as protein flour) and poly(glycidyl ether) can be mixed together prior to the base being added. In one aspect the protein (such as protein flour) and poly(glycidyl ether) can be premixed, with the base being added just prior to being applied to the wood substrate. For example the base may be added to the premixed protein (such as a protein flour) and poly(glycidyl ether) in a mixing apparatus just prior to the wood adhesive composition being applied to the wood substrate. In one aspect the protein and poly(glycidyl ether) are mixed (optionally with a wetting agent such as sodium meta bisulfite) at least two hours prior to the base being added (for example, at least 4, 8, 12, 18, or 24 hours prior to the base being added). Examples of mixing apparatus include mixing tanks and in-line mixers. In another aspect the premixed protein and poly(glycidyl ether) may be applied to the wood substrate, with the base being later sprayed onto the coated wood substrate.

Curing of the wood and wood adhesive composition to form the composite wood product typically is carried out by heating with the addition of pressure if desired to ensure the wood adhesive composition penetrates within the pore structures of the wood. Typically, a temperature of from 80° C. to 165° C. is applied, and pressures of from 50 to 300 psi are applied to the materials during curing.

If utilized, an unfolding agent in addition to the base, such as anionic detergents, cationic detergents, salts, urea, guanidine may be mixed with the protein prior to heating, and prior to addition of a pH basic activating agent. The protein/unfolding agent mixture is typically agitated in the presence of added heat in order to enhance the denaturing of the protein. As indicated earlier, the addition of an unfolding agent may increase the viscosity of the composition as the protein is denatured. If a plasticizing agent is included within the wood adhesive composition, it typically is added at the end of the adhesive mixing process, but may be added at any time during the process including before, during, or after application to the wood.

The wood adhesive of this invention may also comprise a viscosity reducing agent. Viscosity reducing agents include wetting agents, such as sodium bisulfite and sodium sulfite. Modified starches such as maltodextrins and dextrins may also be added to reduce the overall viscosity of the composition. Additionally, protease enzymes may be added to reduce the molecular weight of the protein and thereby reduce the viscosity of the protein.

Manufacture of Composite Wood Products:

In a typical process to produce a wood adhesive composition of the invention for the use as a plywood adhesive, a dry protein powder or protein flour, such as a 20-90 PDI soy flour (and mixtures of soy flours having different PDI values), for example, a soy flour with a PDI from 70 to 90, is dispersed in water at a temperature of between 15-25° C. with sufficient mixing to produce a homogeneous protein dispersion at a target weight percent of solids to achieve the desired viscosity of the final wood adhesive composition to be applied to the wood (as further discussed below). Typically, the wood adhesive composition typically comprises from 20 percent by weigh to 60 percent by weight dry solids, preferably from 30 percent by weight to 50 percent by weight dry solids, and more preferably from 30 percent by weight to 40 percent by weight dry solids in the wood adhesive compositions useful for the manufacture of plywood (for example from 32 percent by weight to 37 percent by weight dry solids in the wood adhesive composition), and from 40 percent by weight to 55 percent by weight dry solids in the wood adhesive composition for MDF, HDF, particle board, and OSB. The proportion of the wood adhesive composition not considered dry solids is water.

Optionally, a viscosity reduction agent is added such as sodium bisulfite or sodium sulfite. Typically from 0.1% to 1.0% by weight dry sodium sulfite based on the dry weight of the soy flour. Optionally, a defoamer may be added to control foam generation during the mixing process. After approximately 5-10 minutes of mixing the bisulfite or sulfite typically has sufficiently reacted with the protein to reduce the dispersion viscosity. Optionally, a plasticizing agent such as glycerol, may be added along with a protein unfolding agent such as urea. Typical addition levels of the plasticizing agent and the protein unfolding agent may be approximately 10 weight % of the soy flour dry weight plus the plasticizing agent and unfolding agent, if present, for each component. After mixing to produce a thoroughly dispersed formulation, a poly(glycidyl ether) crosslinking agent is added. For example, in the manufacture of multi-ply plywood, poly (glycidyl ether), (such as neopentylglycol diglycidyl ether, 1,4-butanediglycidyl ether, trimethylolpropane triglycidyl ether and other di- and triglycidyl ethers) may be added to obtain a wood adhesive composition having from 4 parts by dry weight solids to 20 parts by dry weight solids of the crosslinking agent to 100 parts by dry weight solids of the protein flour containing 52 percent by weight protein. Mixing is continued until a uniform distribution of the crosslinking agent into the protein flour is achieved. At this point, the pH of the wood adhesive composition may be adjusted to above 8 with a basic activating agent. Optionally, the basic activating agent may be added to the dry protein flour before formulating to a dispersion with water in order to simplify the pH adjustment step. For example, dry magnesium oxide or calcium oxide may be added to a dry protein flour and mixed together thoroughly in a sufficient ratio such that when the protein oxide mixture is dispersed in water the pH of the formulation is raised to above pH 8. A typical mixture ratio would be for instance, 10 parts by weight of the protein flour (containing 52 percent by weight protein), to 1 part of the oxide. In another aspect, the poly(glycidyl ether) is added before or during the dispersion of the protein in the water.

Alternatively, the basic activating agent may be added to water prior to the protein flour being added to the water. With the other components utilized in the inventive wood adhesive composition being added simultaneously with the protein flour or after the protein flour has been dispersed in the water.

When the desired components of the wood adhesive composition are sufficiently mixed, and the desired pH of the formulation has been achieved, the wood adhesive is ready to be applied to a wood product. It is important for the wood adhesive composition to have a viscosity that allows for proper application to the wood. In the manufacture of plywood for example, a preferable wood adhesive composition of this invention will have a viscosity ranging from about 20,000 cps to about 200,000 cps (Brookfield @ 10 RPM) at a temperature of 80° F. More preferably, the viscosity would range from about 30,000 cps to about 150,000 cps at 80° F. Most preferably, the viscosity would range from about 50,000 cps to about 100,000 cps at 80° F. Plywood panels are made using the wood adhesive compositions of this invention by applying the adhesive to the wood layers using any of several commercial processes; including roll coaters, curtain coaters and spray coaters. The assembled plywood panel is then subjected to either a cold and/or hot pressing process to complete the adhesive transfer and curing, to form the durable wood bond. The press times to produce the final plywood product typically can range from only a few seconds to several minutes depending on the press temperature and thickness of the panel being pressed. The press temperatures typically can range from room temperature to 165° C. The press pressures typically can range from about 25 PSI to 200 PSI, more preferably from about 50-175 PSI, and most preferably from about 75-150 PSI. The temperatures and press pressures utilized will vary based on the final pH of the wood adhesive composition, the protein and poly(glycidyl ether) utilized, the wood type utilized, the moisture content of the wood and the overall wood composite product thickness. Achieving a temperature in the middle of the product (that is typically in the form of a panel) of 90° C.–105° C. for 30-60 seconds is generally sufficient to cure the adhesive to achieve the desired panel properties.

When the composite wood product comprises multi-ply plywood, the veneers utilized to manufacture the plywood typically will have moisture levels from 2 to 12 percent by weight moisture. In some aspects, it is preferable that the veneers utilized to manufacture the plywood have from 5 to 10 percent by weight moisture, preferably from 7 to 9 percent by weight moisture, and more preferably from 6 to 9 percent by weight moisture. It is believed these moisture levels will enhance the ability of the finished cured multi-ply plywood to pass soak test requirements. This may be especially beneficial when binding two fir plys to each other.

Other composite wood products, such as particleboard (PB) or medium density fiberboard (MDF), high density fiberboard (HDF) and oriented strand board (OSB) can also be produced using the wood adhesive compositions of this invention. In any of those products, the adhesive typically will be applied to the wood fiber or particles using any of the commercially viable adhesive application processes including spraying, paddle shear mixing, and blow-line, and others processes known of skill in the art to form a adhesive impregnated wood mat. The uncured wood mat is then compressed using a cold press and then placed in a hot press similarly as described, above for the manufacture of plywood. A continuous press may also be used. Variations of the wood adhesive composition expected to be utilized to produce composite wood product panels of this type typically will be lower viscosity (<20,000 cPs at 80° F.) (for example less than 10,000 cPs at 80° F., and preferably less than 3,000 cPs at 80° F.) and higher solids (>45% total solids). For example, the preferred protein source may exhibit a higher PDI (e.g. greater than 85 PDI) and the poly(glycidyl ether) typically will have a molecular weight less than 1000 daltons, and in some instances less than 500 daltons.

The following examples are presented to illustrate the invention and to assist one of ordinary skill in understanding, making, and using the invention. The examples are not intended in any way to otherwise limit the scope of the invention.

EXAMPLES

The following test procedures utilized in the preparation and evaluating the properties of the wood adhesive compositions and its use in the manufacture of plywood panels, are provided for the following examples.
Test Procedures
General Procedure for Producing a Wood Adhesive Composition The following procedures are used to make the wood adhesive compositions utilized to make the 2-ply and 3-ply plywood samples set forth below. To a 500 ml stainless steel beaker is added 189.0 g of DI water along with 2 drops of a polyethoxylate-based defoamer available from Hydrite Chemicals, under the product designation MCA 270. 0.8 g of sodium sulfite is added and the beaker is clamped in place and fitted with an agitator and overhead mixer. Agitation is begun at a rate of approximately 500 revolutions per minute ("rpm") and 110.5 g of a 100 Ground Mesh Size/90 PDI soy flour (5% moisture), or other protein as indicated in the examples, is slowly added to the water. Mixing is continued for 10 minutes until a uniform soy flour dispersion at 35% by weight total solids is achieved. Once a uniform soy flour dispersion is obtained, the mixing speed is reduced to 100 rpm and maintained for the remainder of the study. Optionally, plasticizers and unfolding agents are added at this point if indicated for the particular example. The pH of the formulation is raised to the pH indicated in the examples by the addition of an approximately 25% sodium hydroxide aqueous solution. To the pH adjusted soy flour dispersion a poly(glycidyl ether) or crosslinker, such as an AE polymer, is added at the level indicated in the examples. After mixing for a minimum of 10 minutes, the material dispersion is ready for use on the wood products. Preferably, the material will be continuously agitated prior to use to maintain a homogeneous dispersion of poly(glycidyl ether), soy flour and other additives. As indicated in the examples, the poly(glycidyl ether) may be added before or after the pH is adjusted. If added after the pH is adjusted, an additional pH adjustment may be applied. Stage 3 testing is conducted with the pH adjusted after the poly(glycidyl ether) is added.

Viscosity Measurements

For the following examples Viscosity measurements are conducted at 75° F. (unless indicated otherwise) on a Brookfield viscometer Model RV DV-II+ (Brookfield Engineering, Middleboro, Mass.) utilizing the standard spindle #6 at 10 rpm. It is believed the viscosity measured at 75° F. would be slightly higher than the measurements (less than 10% higher) than the viscosity measured at 80° F. The viscosity readings are taken 10 seconds after the spindle rotation has begun to ensure an accurate and consistent measurement procedure is employed. Other spindles may be used if the viscosity is <20,000 or greater than 100,000, but the speed should always be 10 rpm to maintain a constant shear rate.

Preparation and Evaluation of Stage 1 2-Ply Plywood Samples

Two-ply plywood samples made from birch tongue depressors are used to determine the dry strength and wet strength properties of the wood adhesive compositions for Stage 1 evaluation. Standard 6 inch (15 cm) by ⅝ inch (17 mm) by 1/16 inch thick birch tongue depressors available from Crosstex International, Inc. of Hauppauge, NY are utilized to manufacture two-ply plywood samples. Two inch strips are cut from these depressors for the top plys. For the bottom ply, one tongue depressor is cut in half. The two matched halves of the bottom ply are reassembled on a sheet of blotter paper and to this is applied the two inch top ply strip containing the wood adhesive on one surface. The top panel is centered and pressed in place on top of the bottom ply precisely between the cut on the bottom panel to create an overlap bond. A metal plate is centered on the top of the assembled wood samples, three samples for dry strength evaluation and five samples for wet strength evaluation, and a 6 kg weight is placed on top of the metal plate for a stand time period of 10 minutes. Subsequent cold pressing of the wood laminate samples are performed on a standard TAPPI handsheet press (Noram press, Lorentzen & Wettre, Pointe Claire, Quebec, Canada) at an inlet pressure setting of 70 psi (200 psi applied to the plywood samples) and at room temperature. The 1st pressing setting is used for the cold press cycle, which presses for 5.5 minutes. The hot pressing cycle is performed on an independently manufactured dual heated platen hot press with an inlet pressure setting of 200 psi to the pressing platens (60 psi applied to the plywood samples). The platens are temperature controlled and the hot press temperature setting is controlled to 125° C. for both top and bottom platens. The hot pressing cycle time is 5 minutes. The pressed 2-ply samples are allowed to equilibrate 14-20 hours under ambient laboratory conditions before testing.

The dry strength performance of the resulting 2-ply plywood samples is measured on an Instron Model 5943 Tensile Tester fitted with a 11th testing head. The underhanging longitudinal edges of the bottom ply are clamped into the Instron tensile tester and the heads are pulled apart at a 25 mm per minute rate until failure of the two ply sample occurs. The three two ply samples are measured for peak tensile force achieved, and the results for each sample are averaged to obtain the dry tensile force results for the particular adhesive utilized.

For evaluation of Stage 1 wet strength, a water bath is heated to at least 95° C. and the two ply plywood samples are added to the boiling water bath and soaked for 1 hour. The samples are carefully removed from the hot water and placed on a towel for cooling and removal of the bulk water. After cooling to ambient temperature for a period of not more than 5 minutes, the bottom ply of the 2-ply plywood samples are clamped in place on the Instron Model 5943 Tensile Tester fitted with the 1 kN testing head as described above, and pulled at a rate of 25 mm per minute until failure occurs. The five 2-ply plywood samples are measured for peak tensile force achieved, and the results are averaged to obtain the wet tensile force for the particular adhesive utilized.

Preparation and Evaluation of Stage 2 3-Ply Plywood Samples

Four inch by four inch fir veneers ⅛ inch in thickness are utilized to construct 3-ply plywood samples, as described below. Two to three grams of the prepared wood adhesive compositions set forth in the examples are applied to a fir ply to be used for the bottom of the 3-ply plywood samples and the prepared wood adhesive indicated in the examples is spread to evenly cover the surface of the fir ply using a rubber hand roller. Typically 1.5 to 2 grams of a wood adhesive composition is applied to each bond-line between the plys. The center fir ply is centered on top of the bottom ply with the grain of the wood in the center ply being perpendicular to the grain of the wood in the bottom ply. Additional wood adhesive composition as indicated in the examples is spread to evenly cover the top surface of the center ply using a rubber roller. The top fir ply is centered over the top surface of the center ply with the wood grain of the bottom of the top fir ply being perpendicular to the wood grain of the top of the center ply. A metal plate is placed on the 3-ply sample stack along with a 6 kg weight for a time period of 10 minutes. This is to simulate a commercial "stand time" procedure.

Stage 2 cold pressing of the 3-ply plywood samples are performed on a standard TAPPI handsheet press (Noram press, Lorentzen & Wettre, Pointe Claire, Quebec, Canada) at an inlet pressure setting of 70 psi (163 psi applied to plywood sample) and at room temperature. The 1st pressing setting is used for the cold press cycle, which presses for 5.5 minutes. The hot pressing of the three ply plywood samples is performed on an independently manufactured dual heated platen hot press with an inlet pressure setting of 200 psi (49 psi applied to plywood sample) to the pressing platens. The platens are temperature controlled and the hot press temperature setting is controlled to 125° C. for both top and bottom platens. The hot pressing cycle time is 10 minutes. The pressed 3-ply plywood samples are allowed to equilibrate 14-18 hours under ambient laboratory conditions before testing.

The Stage 2 three ply cured plywood samples are subjected to the method set forth in ANSI/HPVA HP-1-2000 (Section 4.6) Three-Cycle Soak Test for evaluation of water stability of the wood adhesive, with the exception that the plywood samples were 4 inch by 4 inch instead of the two inch by five inch plywood samples called for in the method. After the third soak and drying cycle, a delamination evaluation is performed by measuring the total area of delamination between each ply (cm² or in²), dividing this number by the total glue line area of the cured three ply plywood samples, and multiplying by 100. This provides a quantitative evaluation of the % delamination for each cured three ply plywood sample.

Preparation and Evaluation of Stage 3 5-Ply Plywood Samples

Twelve inch by twelve inch wood veneers are utilized to construct 5-ply plywood samples, as described below. The three center plys of the 5-ply plywood samples are ⅙ inch or 1/10 inch fir, while the veneers used for the top and bottom ply are 1/40 inch maple and oak, and are assembled as shown in the configuration shown in Table 1:

TABLE 1

Plywood Assembly

| Wood Type | Lathe Checks | Thickness (inch) |
|---|---|---|
| Maple | Down | 1/40 |
| Fir | Down | 1/10 |
| Fir | Down | 1/6 |
| Fir | Down | 1/10 |
| Oak | Up | 1/40 |
|  | Total (in) | 0.42 |

The wood adhesive compositions are applied with a rubber roller to deposit the amount of wood adhesive composition set forth in Table 2 on the top and bottom of the second and fourth plys (i.e. the 1/10" thick fir plys) to simulate a commercial roll coater. Stand time period, assembly time period (indicated as "open" time), cold pressing cycle time, cold press temperature and cold press pressure, and hot pressing cycle time, hot press temperature and hot press pressure are as set forth in Table 2.

TABLE 2

Plywood Process Parameters

| Wood Adhesive Applied (g/ft²) | 21-29 |
|---|---|
| Open Time period (min) | 9-12 |
| Stand Time period (min) | 10 |
| Cold Press Temperature (° C.) | Room Temp |
| Cold Press Cycle time (min) | 5 |
| Cold Press Pressure applied (psi) | 100 |
| Hot Press Temperature (° F.) | 215-235 |
| Hot Press Cycle Time (min) | 2.5-5.0 |
| Hot Press Pressure applied (psi) | 135 |

The stand time period is 10 minutes and a 10 lb weight is applied to the wood stack during this period to simulate a stack weight. The Stage 3 cold pressing cycle is performed on a 12 ton Carver press (Carver, Inc., Wabash, Ind.) set to a pressure of 100 psi on the wood panels at a temperature of 70-73° F. The cold pressing cycle time is 5 minutes. The Stage 3 hot pressing cycle is performed on a 12 ton Carver hot press (Carver, Inc., Wabash, Ind.) set to a temperature of 215-235° F. (102-113° C.) and a pressure of 135 psi. The hot press cycle time is varied between 2.5-5 minutes as set forth in the examples in order to evaluate cure speed of the wood adhesive compositions. After hot pressing, the 12×12 inch 5-ply plywood samples are cut into 2×5 inch blocks for a Three-Cycle Soak Test according to the method described in ANSI/HPVA HP-1-2000 (Section 4.6). After the third soak and drying cycle, a delamination evaluation is performed to determine both a pass/fail evaluation per the standard and a measurement of the area of delamination between each ply (cm² or in²), dividing this number by the total glue line area of the plywood panel, and multiplying by 100 to determine a quantitative evaluation of the % delamination for the cured 5-ply plywood samples of the examples.

Example 1

Dry and Wet Tensile Evaluation of Stage 1 2-Ply Plywood Samples

Comparative Example 1.1

A room temperature aqueous dispersion of 100 Ground Mesh Size/90 PDI soy flour available from Cargill, Incorporated under the Prolia brand (52 wt % protein) is prepared at 35% solids as described in the General Procedure for Producing a Wood Adhesive Composition, above. Small samples are removed and applied to construct 2-ply plywood samples as described in the Preparation and Evaluation of Stage 1 2-Ply Plywood Samples, above.

Comparative Example 1.2

After pressing and curing the 2-ply plywood samples of Comparative Example 1.1, the remaining soy flour dispersion's pH is adjusted to 10.5 with 25% sodium hydroxide solution. The soy flour dispersion is allowed to mix for 10 minutes and small samples are removed and applied to construct 2-ply plywood samples as described in the Preparation and Evaluation of Stage 1 2-Ply Plywood Samples, section.

Example 1.1

After hot pressing 2-ply plywood samples of Comparative Example 1.2, 11 g of neopentylglycol diglycidyl ether, available from Cargill, Incorporated under the designation ChemMod 68, is added to the remaining soy flour dispersion and allowed to mix for 30 minutes. Small samples are removed and applied to construct 2-ply plywood samples, as described in the Preparation and Evaluation of Stage 1 2-Ply Plywood Samples, above.

Example 1.2

After hot pressing 2-ply plywood samples of Example 1.1, additional small samples of the adhesive composition from Example 1.1 are removed and applied to construct 2-ply plywood samples, as described in the Preparation and Evaluation of Stage 1 2-Ply Plywood Samples, above, but with an adhesive that had an additional 1.5 hours of mixing time over the mixing time of the adhesive sample of Example 1.1.

After pressing, the 2-ply plywood samples from Comparative Example 1.1, Comparative Example 1.2, Example 1.1, and Example 1.2 are allowed to equilibrate to laboratory ambient conditions for 20 hours. Dry Tensile and Wet Tensile testing is carried out in accordance with the procedures described in the Preparation and Evaluation of Stage 1 2-Ply Plywood Samples. The results of this testing is set forth in Table 3:

TABLE 3

| Sample | Dry Tensile (grams force) | Wet Tensile (grams force) |
|---|---|---|
| Comparative Example 1.1 | 908.6 | 77.4 |
| Comparative Example 1.2 | 942.5 | 324.5 |
| Example 1.1 | >1000* | 381.5 |
| Example 1.2 | >1000* | 517.5 |

*Did not break. Maximum of the Instron 1 kN head was reached.

As can be seen in Table 3, the dry and wet tensile (also known as tensile strength) of 2-ply plywood samples made using the wood adhesive compositions of the invention are increased over the dry and wet tensile strength exhibited by 2-ply plywood samples made using the soy flour dispersion by itself (Comparative Example 1.1), and that of the soy flour dispersion at elevated pH (Comparative Example 1.2). It also is demonstrated that the wet tensile strength exhibited by the 2-ply plywood samples made with wood adhesive composition of the invention that have been subjected to additional mixing times is improved compared with 2-ply plywood samples made with wood adhesive compositions subjected to a shorter mixing time. While not wanting to be bound by theory, it is believed that the additional mixing time after the pH is adjusted allows the proteins in the composition to unfold more effectively than samples made using a shorter mixing time after the pH is adjusted. This will make the wood adhesive composition of the invention particularly useful in commercial production lines where the wood adhesive composition is subjected to long periods before application to the wood substrate, for example from 4 to 24 hours.

Example 2

Dry and Wet Tensile Evaluation of Stage 1 2-Ply Plywood Samples

Comparative Example 2

A dry powder mix is prepared by mixing 100 Ground Mesh Size/90 PDI soy flour (52 wt % protein) available from Cargill, Incorporated under the Prolia brand with magnesium oxide (98% purity) available from Acros Organics in a weight ratio of 6 parts of the soy flour to 1 part of the magnesium oxide. A room temperature aqueous dispersion of the 100/90 soy flour/magnesium oxide mixture is prepared at 35% solids as described in the General Procedure for Producing a Wood Adhesive Composition, above, except that no aqueous sodium hydroxide solution is added to raise the pH. The mixture is allowed to mix for 30 minutes and the pH of the dispersion is measured to be 10.2. Small samples are removed and applied to construct 2-ply plywood samples, as described in the Preparation and Evaluation of Stage 1 2-Ply Plywood Samples, above.

Example 2.1

To the remaining soy flour/magnesium oxide dispersion 0.5 g of neopentylglycol diglycidyl ether available from Cargill, Incorporated under the designation ChemMod 68 is added and mixed for 30 minutes before small samples are removed and applied to construct 2-ply plywood samples, as described in the Preparation and Evaluation of Stage 1 2-Ply Plywood Samples, above.

Example 2.2

To the remaining composition of Example 2.1, an additional 0.5 g of neopentylglycol diglycidyl ether is added, and the composition is mixed for 30 minutes before small samples are removed and applied to construct 2-ply plywood samples, as described in the Preparation and Evaluation of Stage 1 2-Ply Plywood Samples, above.

Example 2.3

To the remaining composition of Example 2.2 an additional 1.0 g of neopentylglycol diglycidyl ether is added, and the composition is mixed for 30 minutes before small samples are removed and applied to construct 2-ply plywood samples, as described in the Preparation and Evaluation of Stage 1 2-Ply Plywood Samples, above.

Example 2.4

A dry powder mix is prepared by mixing 100 Ground Mesh Size/90 PDI soy flour (52 wt % protein) available from Cargill, Incorporated under the Prolia brand with magnesium oxide (98% purity) available from Acros Organics in a weight ratio of 6 parts of the soy flour to 1 part of the magnesium oxide. A room temperature dispersion of the 100/90 soy flour/magnesium oxide mixture is prepared at 35% solids as described in the General Procedure for Producing a Wood Adhesive Composition, above. The mixture is mixed for 30 minutes and the pH of the dispersion is measured to be 10.2.

2.0 g of 1,4-butanediglycidyl ether available from Cargill, Incorporated under the designation ChemMod 67 is added to the dispersion and the composition is mixed for an additional 30 minutes before small samples are removed and applied to construct 2-ply plywood samples, as described in the Preparation and Evaluation of Stage 1 2-Ply Plywood Samples, above. The 2-ply plywood samples of Example 2 are allowed to equilibrate under Laboratory ambient conditions for 20 hours before Wet Tensile testing is carried out in accordance with the procedures described in the Preparation and Evaluation of Stage 1 2-Ply Plywood Samples. The results of this testing is set forth in Table 4:

TABLE 4

| Sample | Wet Tensile (gram force) |
|---|---|
| Comparative Example 2 | 134.2 |
| Example 2.1 | 332.3 |
| Example 2.2 | 343.8 |
| Example 2.3 | 361.7 |
| Example 2.4 | 379.0 |

As can be seen in Table 4, the wet tensile of the wood adhesive composition of this invention (Examples 2.1-2.4) is increased over that of the soy flour/magnesium oxide dispersion (Comparative Example 2). This Example also demonstrates that the pH of the wood adhesive composition may be adjusted by the addition of dry alkali earth metal salts into the dry soy flour prior to dispersing in water. This Example also demonstrates that various poly(glycidyl ether)s, can be utilized in the invention.

Example 3

Determination of Wood Adhesive Composition Viscosity as a Function of Time

Three separate wood adhesive compositions of the invention are prepared according to the method described in the General Procedure for Producing a Wood Adhesive Composition, above, with the following exceptions: 1) the % by weight solids of the compositions are raised to 38% total solids; and 2) The compositions are prepared at 90° F. and kept at that temperature throughout the experiment.

Example 3.1 is prepared utilizing a 100 Ground Mesh Size/90 PDI soy flour (52 wt % protein) available from Cargill, Incorporated under the Prolia designation, which is adjusted to a pH of 10.5 with a 25% sodium hydroxide solution to which 10% by weight of neopentylglycol diglycidyl ether based on the total dry weight of the soy flour plus neopentylglycol diglycidyl ether (available from Cargill, Incorporated under the designation ChemMod 68), is added. As indicated, the mixing temperature is 90° F. Samples are taken at the mixing times indicated in Table 5.

Example 3.2: is prepared utilizing a 6:1 weight to weight mixture of 100 Ground Mesh Size/90 PDI soy flour (52 wt % protein) available from Cargill, Incorporated under the Prolia designation and magnesium carbonate. After dispersion of this mixture at 90° F., 10% by weight of neopentylglycol diglycidyl ether based on the total dry weight of the soy flour, magnesium carbonate and neopentylglycol diglycidyl ether (available from Cargill, Incorporated under the designation ChemMod 68) is added. The pH of the mixture is determined to be 9.5. Mixing temperature is held at 90° F. for the duration of the test and samples are taken at the mixing times indicated in Table 5.

Example 3.3: is prepared utilizing a 100 Ground Mesh Size/90 PDI soy flour (52 wt % protein) available from Cargill, Incorporated under the Prolia designation and neopentylglycol diglycidyl ether available from Cargill, Incorporated under the designation ChemMod 68. The pH of this sample is not pH adjusted (pH=5.0). Mixing temperature is held at 90° F. and samples are taken at the mixing times indicated in Table 5. Viscosity measurements are conducted on the wood adhesive compositions as described in the Viscosity Measurements description above, with the results set forth in Table 5:

TABLE 5

| Mixing Time @ 90° F. | Example 3.1 Viscosity cPs @ 90° F.* | Example 3.2 Viscosity cPs @ 90° F.* | Example 3.3 Viscosity cPs @ 90° F.* |
| --- | --- | --- | --- |
| 30 minutes | 52,500 | 66,500 | 28,500 |
| 1 hour | 53,600 | 56,500 | 28,500 |
| 2 hours | 56,300 | 49,700 | 28,700 |
| 3 hours | 67,200 | 46,500 | 27,100 |
| 4 hours | 86,200 | 47,400 | 28,800 |
| 5 hours | 92,500 | 47,300 | 29,200 |
| 6 hours | 96,800 | 49,000 | 32,600 |

*It is believed the viscosity measured at 90° F. would be slightly lower than the measurements (less than 10% lower) than the viscosity measured at 80° F.

From the results in Table 5, the wood adhesive compositions of this invention have a usable viscosity (e.g. greater than 20,000 cPs and less than 200,000 over a 6 hour time period). Also, as can be seen from Table 5, the viscosity of the samples are higher for pH's above 9, and at pH's above 10 the wood adhesive composition provides for enhanced viscosity over 50,000 cPs as mixing times increase. Therefore, it will be preferable to utilize higher pH's (i.e. greater than 9, and more preferably greater than 10) when it is important to maintain or increase the viscosity when the wood adhesive composition is maintained for a long period time before being utilized to make composite wood products.

Example 4

Preparation of Stage 2 3-Ply Plywood Samples

Comparative Example 4

A room temperature aqueous dispersion of 100 Ground Mesh Size/90 PDI soy flour (52 wt % protein) available from Cargill, Incorporated under the Prolia brand is prepared at 35% solids as described in the General Procedure for Producing a Wood Adhesive Composition above. The pH of the dispersion is adjusted with a 25% aqueous solution of sodium hydroxide to 10.45. After 10 minutes of mixing, a sample is removed and applied to the top of a 4 inch by 4 inch ply of white fir (with the lathe checks facing up), targeting 1.5-2 grams of wood adhesive composition for the ply, and rolled with a hand roller until an even distribution of the composition is applied. A second ply of Douglas fir (with lathe checks facing down) is placed on top of the bottom fir ply, ensuring that the wood grain direction in the second ply is perpendicular to the wood grain direction of the bottom ply. Additional wood adhesive composition is applied to the top of the second ply targeting 1.5-2 grams of the composition. The top of the second ply is rolled with a hand roller until a uniform distribution of the wood adhesive composition is achieved on the top of the second ply. A top ply of white fir (with lathe checks facing down) is placed on top of the second panel ensuring that the wood grain direction of the top ply is perpendicular to the wood grain direction of the second ply. A stainless steel plate is placed on top of the 3-ply samples and a 6 kg weight is added and allowed to stand for 10 minutes. After the stand time is completed, the 3-ply samples are cold pressed and hot pressed as described in the Preparation and Evaluation of Stage 2 3-Ply Plywood Samples, above.

Example 4

To the remaining composition of Comparative Example 4 (100 g of dry weight soy flour), is added 11.0 g of neopentylglycol diglycidyl ether available from Cargill, Incorporated under the designation ChemMod 68 to prepare a protein and poly(glycidyl ether) wood adhesive composition. The mixture is allowed to mix at approximately 100 rpm for 1 hour prior to being applied to construct 3-ply fir samples, which are cured and tested in accordance the procedures set forth in Preparation and Evaluation of Stage 2 3-Ply Plywood Samples. The results of the testing are set forth in Table 6.

Example 5

Preparation of Stage 2 3-Ply Plywood Wood Samples

Comparative Example 5

A room temperature aqueous dispersion of dry pea flour containing 55% by weight protein available from Dakota Dry Bean, Inc. is prepared at 35% solids as described in the General Procedure for Producing a Wood Adhesive Composition, above. The pH of the dispersion is adjusted with a 25% aqueous solution of sodium hydroxide to 10.50 and mixed for an additional 10 minutes before a sample is removed and applied to the top of a 4 inch by 4 inch panel of white fir (with the lathe checks facing up), targeting 1.5-2 grams of the composition to be applied to the upper surface of the ply, and rolled with a hand roller until an even distribution of the composition is achieved. A second ply of Douglas fir (with the lathe checks facing down) is placed on top of the bottom fir ply, ensuring that the wood grain direction of the second ply is perpendicular to the wood grain direction of the bottom ply. Additional 1.5 to 2 grams of the composition is applied to the top of the second ply. A hand roller is used to evenly distribute the composition on the top of the second ply. A top ply of white fir (with the lathe checks facing down) is placed on the top of the second ply with the wood grain direction arranged perpendicular to the wood grain direction of the second ply. A stainless steel plate is placed on top of the 3-ply samples and a 6 kg weight is added and allowed to stand for 10 minutes. After the stand time is completed, the 3-ply samples are cold pressed and hot pressed as described in the Preparation for Stage 2 3-Ply Plywood Sample, above.

Example 5

To the remaining dispersion from Comparative Example 5, 11.0 g of neopentylglycol diglycidyl ether available from Cargill, Incorporated under the designation ChemMod 68 is added to prepare a protein and poly(glycidyl ether) wood adhesive composition. The mixture is mixed at approximately 100 rpm for 1 hour prior to applying the mixture to the fir panels similar to those used in Comparative Example 5 to construct 3-ply fir samples, which are cured and tested in accordance the procedures set forth in Preparation and Evaluation of Stage 2 3-Ply Plywood Samples. The results of the testing are set forth in Table 6.

Example 6

Preparation of Stage 2 3-Plywood Samples

Comparative Example 6

A room temperature aqueous dispersion of dry corn protein isolate available from Cargill, Incorporated (95% by weight protein) is prepared at 16% solids as described in the General Procedure for Producing a Wood Adhesive Composition, above. The pH of the dispersion is adjusted with a 25% solution of sodium hydroxide to 10.52. After 10 minutes of additional mixing, a sample is removed and applied to a bottom ply of a 4 inch by 4 inch panel of white fir (with the lathe checks facing up), targeting 1.5-2 grams of adhesive for the top of the ply, and rolled with a hand roller until an even distribution of the composition is applied. A second ply of Douglas fir (with the lathe checks facing down) is placed on top of the bottom fir ply, arranged so that the wood grain direction of the second ply is perpendicular to the wood grain direction of the bottom ply. Additional quantities of the dispersion composition is applied to the top of the second ply again targeting 1.5-2 grams of dispersion composition. The composition is rolled with a hand roller until a uniform distribution of the composition is achieved on the top of the second ply. A top ply of white fir (with the lathe checks facing down) is placed on the top of the second ply with the ply arranged so that the wood grain direction of the top ply is perpendicular to the wood grain direction of the top ply. A stainless steel plate is placed on top of the 3-ply samples and a 6 kg weight is added and allowed to stand for 10 minutes. After the stand time is complete, the 3-ply samples are cold pressed and hot pressed as described in the Preparation for Stage 2 3-Ply Plywood Samples above.

Example 6

To the remaining dispersion from Comparative Example 6, 5.0 g of neopentylglycol diglycidyl ether available from Cargill, Incorporated under the designation ChemMod 68 is added. The mixture is allowed to mix at approximately 100 rpm for an additional 1 hour prior to applying to the fir panels similar to those used in Comparative Example 5 to construct 3-ply fir samples, which are cured and tested in accordance the procedures set forth in Preparation and Evaluation of Stage 2 3-Ply Plywood Samples. The results of the testing are set forth in Table 6.

Example 7

Preparation of Stage 2 3-Ply Plywood Samples

Comparative Example 7

A room temperature aqueous dispersion of 100 Ground Mesh Size/90 PDI soy flour (52 wt % protein) available from Cargill, Incorporated under the Prolia brand is prepared at 35% solids as described in the General Procedure for Producing a Wood Adhesive Composition, above. The pH of the dispersion is adjusted with a 25% solution of sodium hydroxide to 10.45. After an additional 10 minutes of mixing, a sample is removed and applied to the top surface of a bottom ply of 4 inch by 4 inch ply of white fir (with lathe checks facing up), targeting 1.5-2 grams of the dispersion composition for the top surface of the ply, and rolled with a hand roller until an even distribution of the composition is applied. A second ply of Douglas fir (with the lathe checks facing down) is placed on top of the bottom fir ply, ensuring that the wood grain direction in the second ply is perpendicular to the wood grain direction of the bottom ply. 1.5 to 2 grams of the same composition applied to the bottom ply is applied to the top surface of the second ply targeting 1.5-2 grams of the composition. A hand roller is used to uniformly distribute the composition on the top surface of the second ply. A top ply of white fir (with the lathe checks facing down) is placed on the top surface of the second ply with the wood grain direction of the top ply arranged to be perpendicular to the wood grain direction of the second ply. A stainless steel plate is placed on top of the 3-ply samples and a 6 kg weight is added and allowed to stand for 10 minutes. After the stand time is completed, the 3-ply samples are cold pressed and hot pressed as described in the Preparation and Evaluation of Stage 2 3-Ply Plywood Samples, above.

Example 7

To the remaining dispersion from Comparative Example 7, 5.5 g of trimethylolpropane triglycidyl ether available from Cargill, Incorporated under the designation ChemMod 48 is added. The mixture is mixed at approximately 100 rpm for 1 hour prior to applying to fir panels similar to those used in Comparative Example 5 to construct 3-ply fir samples, which are cured and tested in accordance the procedures set forth in Preparation and Evaluation of Stage 2 3-Ply Plywood Samples.

The results of the testing are set forth in Table 6.

Example 8

Evaluation of Stage 2 Wood Panels

The Stage 2 wood panels prepared in Examples 5, 6, and 7 are evaluated by the Three-Cycle Soak Test ANSI/HPVA HP-1-2000 (Section 4.6) with the following results.

TABLE 6

| Sample | Delaminated Area cm$^2$ | % Delamination |
|---|---|---|
| Comparative Example 4 | 28 | 87.5% |
| Example 4 - | 2 | 6.25% |
| Comparative Example 5 | 16 | 50% |
| Example 5 | 4 | 12.5% |
| Comparative Example 6 | 2 | 6.25% |
| Example 6 | 0 | 0% |
| Comparative Example 7 | 27 | 84.4% |
| Example 7 | 0 | 0% |

As can be seen by the results in Table 6, the wood adhesive compositions of this invention demonstrate an improved water resistance, as measured in the Three-Cycle Soak Test (described in the Preparation and Evaluation of Stage 2 3-Ply Plywood Samples section), over the Comparative Examples. Additionally, these Examples demonstrate that various plant proteins may be utilized in the preparation of the wood adhesive compositions of this invention. It is also demonstrated that bi- and tri-functional glycidyl ethers may be utilized in the preparation of the wood adhesive compositions of this invention.

Example 9

Preparation of Stage 3 5-Ply Plywood Samples

In this example 12 inch by 12 inch panels are prepared in the configuration as described in the Preparation and Evaluation of Stage 3 5-Ply Plywood Samples above with the follow focus parameters:
1) Cure Speed/Press Time—The wood adhesive compositions are evaluated using several hot press times.
2) Dry Bond Strength—The dry bonds within the 5-Ply Samples are evaluated by "knifing" the panels to determine the dry bond wood failure. The greater the wood failure, as opposed to glue failure, the better the result. Although not a formal requirement, a strong dry bond with a high percentage of wood failure is of great importance to manufacturers. Bonds are deemed to be poor (no to low wood failure), fair (modest level of wood failure), or good (high level of wood failure).
3) Durability/Soak performance of the final panel—Tests were conducted in accordance with the description set forth in the Preparation and Evaluation of Stage 3 Five Ply Plywood Samples section. As mandated by the ANSI/HPVA HP-1 passing grade of the Three-cycle soak test occurs with minimal to no delamination observed. The fir-fir bond evaluated in this study is considered to be one of the most challenging in the industry with respect to soak performance.

The wood adhesive compositions are made using the following ingredients

PDI 90 SF is 100 Ground Mesh Size/90 PDI soy flour available from Cargill, Incorporated under the Prolia brand (52 wt % protein);

70/20 SF is a mixture of PDI 70 soy flour available from Cargill, Incorporated having 52% by weight protein, and PDI 20 soy flour available from Cargill, Incorporated having 52% by weight protein, wherein the weight ratio of PDI 70 soy flour to PDI 20 soy flour is 80:20;

SMBS is sodium meta-bisulfite (a wetting light denaturing agent);

ChemMod 68 ("CM 68") is neopentylglycol diglycidyl ether available from Cargill, Incorporated;

Mg Oxide is magnesium oxide;

25% NaOH is 25% concentration of sodium hydroxide aqueous solution;

Visc cPs is viscosity in centipoise as measured on a RV Brookfield Model DV-II+ utilizing spindle #6, at 10 rpm at a temperature of 75° F.; and 20% CA1920A aqueous solution containing 20% by dry weight of amine-epichlorohydrin polymer available from Solenis, Inc. under the designation CA1920A.

The ingredients are combined in the concentrations/weight percentages indicated in Table 7 using the following process:

The Stage 3 wood adhesive composition preparation process utilizes a Kitchen Aid mixer with the bread dough mixing attachment. The prescribed amount of water, antifoam, and sodium bi-sulfite is added to the mixing bowl and the Kitchen Aid mixing head lowered into the mixture. The mixing speed is set to 3, and the soy flour is added slowly (1-2 minutes) until all of the soy flour is wetted by the water. The mixing speed is then set to 4, and the components allowed to mix for 2 minutes. The ChemMod 68 poly (glycidyl ether) is then added and the mixing is continued for an additional 5-8 minutes. In Samples 9.3 to 9.7, the pH is then raised by the addition of the prescribed amount of 25% sodium hydroxide solution and mixing is continued for an additional 3 minutes. At this point, the pH is measured with a calibrated pH meter to ensure the correct pH of the adhesive is reached. In Samples 9.1 and 9.2, the hydration of the magnesium oxide creates a high pH condition and therefore no additional pH adjustment is necessary. In Sample 9, the pH of the adhesive is kept near neutral.

TABLE 7

| | Sample 9.1 | Sample 9.2 | Sample 9.3 | Sample 9.4 | Sample 9.5 | Sample 9.6 | Sample 9.7 | Comparative Sample 9 |
|---|---|---|---|---|---|---|---|---|
| Water | 487.8 g | 464.8 g | 328.3 g | 465.7 g | 466.1 g | 465.7 g | 465.7 g | 394.0 g |
| PDI 90 SF | 199.0 g | 217.2 g | | | | | | |
| 70/20 SF | | | 174.2 g | 241.5 g | 232.9 g | 241.5 g | 241.5 g | 276.3 g |
| SMBS | 0.7 g | 0.7 g | 0.6 g | 0.8 g | 0.8 g | 0.8 g | 0.8 g | 0.9 g |
| CM 68 | 27.3 g | 29.9 g | 16.5 g | 28.7 g | 36.8 g | 28.7 g | 28.7 g | |
| Mg Oxide | 33.0 g | 36.2 g | | | | | | |

TABLE 7-continued

|  | Sample 9.1 | Sample 9.2 | Sample 9.3 | Sample 9.4 | Sample 9.5 | Sample 9.6 | Sample 9.7 | Comparative Sample 9 |
|---|---|---|---|---|---|---|---|---|
| 25% NaOH | 0.9 g |  | 9.5 g | 14.0 g | 13.0 g | 12.0 g | 20.0 g |  |
| Antifoam | 0.4 g | 0.4 g | 0.3 g | 0.4 g | 0.4 g | 0.4 g | 0.4 g | 0.4 g |
| CM 68% | 12.5 | 12.5 | 10 | 12.5 | 16.65 | 12.5 | 12.5 |  |
| 20% CA1920A |  |  |  |  |  |  |  | 187.5 g |
| % Solids | 33.0 | 36.0 | 35.0 | 35.0 | 35.0 | 35.0 | 35.0 | 35.5 |
| pH | 10.2 | 10.2 | 10.2 | 10.2 | 10.3 | 9.5 | 11.0 | 6.3 |
| Visc. cPs | 8,500 | 25,400 | 54,100 | 59,000 | 44,200 | 51,400 | 80,600 | 75,000 |

Stage 3 5-Ply Plywood Samples are prepared over a two-day period using 12 inch by 12 inch wood plys as described in the Preparation and Evaluation of Stage 3 3-Ply Plywood Samples section over a two day period. The fir veneers used for assembling 5-Ply Plywood Samples on day one exhibited between 7-9% by weight moisture levels. The fir veneers used for assembling 5-Ply Plywood Samples on day 2 have a moisture level between 2-4% by weight, otherwise the assembly procedures are the same. While preparing the 5-Ply Plywood Samples, it is observed that the lower moisture level veneers are more challenging to bond than the higher moisture veneers. Multiple 5-Ply Plywood Samples are prepared utilizing the various wood adhesive compositions as set forth in Table 8.

TABLE 8

| 5-Ply Plywood Sample # | Wood Adhesive Sample # | Adhesive Application amount g/ft$^2$ | Press Temp ° F. | Press Time (min) |
|---|---|---|---|---|
| Day 1 |  |  |  |  |
| 9.1.1 | 9.3 | 23-25 | 235 | 4 |
| 9.1.2 | 9.3 | 23-25 | 235 | 2.5 |
| 9.1.3 | 9.3 | 23-25 | 217 | 4 |
| 9.1.4 | 9.3 | 29 | 217 | 5 |
| 9.1.5 | 9.4 | 21-22 | 217 | 3 |
| 9.1.6 | 9.4 | 21-22 | 217 | 4 |
| 9.1.7 | 9.4 | 21-22 | 217 | 5 |
| Day 2 |  |  |  |  |
| 9.2.1 | 9.5 | 21-22 | 215 | 5 |
| 9.2.2 | 9.5 | 21-22 | 215 | 4 |
| 9.2.3 | 9.5 | 21-22 | 215 | 3 |
| 9.2.4 | 9.6 | 21-22 | 215 | 5 |
| 9.2.5 | 9.6 | 21-22 | 215 | 4 |
| 9.2.6 | 9.6 | 21-22 | 215 | 3 |
| 9.2.7 | 9.7 | 21-22 | 215 | 5 |
| 9.2.8 | 9.7 | 21-22 | 215 | 4 |
| 9.2.9 | 9.7 | 21-22 | 215 | 3 |
| 9.2.10 | 9.1 | 21-22 | 215 | 5 |
| 9.2.11 | 9.2 | 21-22 | 215 | 5 |
| 9.2.12 | 9.2 | 21-22 | 215 | 4 |
| 9.2.13 | 9.2 | 21-22 | 215 | 3 |
| 9.2.14 | Comparative Sample 9 | 21-22 | 215 | 5 |
| 9.2.15 | Comparative Sample 9 | 21-22 | 215 | 4 |
| 9.2.16 | Comparative Sample 9 | 21-22 | 215 | 3 |

The wet tack performance of the 5-Ply Plywood Samples of Example 9 is good to excellent for Samples 9.2-9.8. The poor wet tack performance of Sample 9.1 is believed to result from the low viscosity of Sample 9.1, (i.e. less than 10,000 cPs).

The 5-Ply Plywood Samples made with Samples 9.1 through 9.8 and Comparative Sample 9 are cooled and trimmed to 2 inch by 5 inch blocks, and then subjected to the Three-Cycle Soak test described above. Six samples obtained from each 5-Ply Plywood Sample were evaluated by Pass/Fail, and 1-2 samples from each 5-Ply Plywood Sample were evaluated by the % delamination evaluation described in the Preparation and Evaluation of Stage 3 5-Ply Plywood Samples section, above. The results are set forth in Table 9.

TABLE 9

| 5-Ply Plywood Sample # | Wood Adhesive Sample # | Press Time (min) | Pass/Fail Soak Test | % Delamination |
|---|---|---|---|---|
| Day 1 |  |  |  |  |
| 9.1.1 | 9.3 | 4 | Pass | 0.6% |
| 9.1.2 | 9.3 | 2.5 | Pass | 1.3% |
| 9.1.3 | 9.3 | 4 | Pass | 0.6% |
| 9.1.4 | 9.3 | 5 | Pass | 0.0% |
| 9.1.5 | 9.4 | 3 | Pass | 3.8% |
| 9.1.6 | 9.4 | 4 | Pass | 5.6% |
| 7 | 9.4 | 5 | Pass | 0.6% |
| Day 2 |  |  |  |  |
| 9.2.1 | 9.5 | 5 | Pass | 0.0% |
| 9.2.2 | 9.5 | 4 | Fail | 7.5% |
| 9.2.3 | 9.5 | 3 | Fail | 5.0% |
| 9.2.4 | 9.6 | 5 | Pass | 1.5% |
| 9.2.5 | 9.6 | 4 | Fail | 0.5% |
| 9.2.6 | 9.6 | 3 | Fail | 27.5% |
| 9.2.7 | 9.7 | 5 | Fail | 6.3% |
| 9.2.8 | 9.7 | 1 | Pass | 6.3% |
| 9.2.9 | 9.7 | 3 | Pass | 2.5% |
| 9.2.10 | 9.1 | 5 | Fail | 60.0% |
| 9.2.11 | 9.2 | 5 | Pass | 35.0% |
| 9.2.12 | 9.2 | 4 | Fail | 90.0% |
| 9.2.13 | 9.2 | 3 | Fail | 30.0% |
| 9.2.14 | Comparative Sample 9 | 5 | Fail | 30.0% |
| 9.2.15 | Comparative Sample 9 | 4 | Fail | 40.0% |
| 9.2.16 | Comparative Sample 9 | 3 | Fail | 32.5% |

As can be seen in Table 9, the 5-Ply Plywood Samples made using the wood adhesive compositions of this invention have a favorable Pass/Fail ratio as compared to the 5-Ply Plywood Samples made using Comparative Sample 9 (Samples 9.1.14 through 9.1.16). While not all 5-Ply Plywood Samples made using wood adhesive compositions of the invention passed the Three-cycle soak test, a large number of then showed good to excellent resistance during the Three-Cycle soak test and only the very dry veneers from the day 2 testing showed any failures. Furthermore, the increase in pH further improved the soak performance even with the dry veneers from day 2.

The dry bond evaluation on the 5-Ply Plywood Samples of Example 9 is performed by attempting to pry the indicated ply layers apart with a knife. The wood failure level is qualitatively determined and the results are grouped into three categories of Good, Fair, and Poor. The results for some of the 5-Ply Plywood Samples are not available for the dry bond test and are not included in Table 10.

TABLE 10

| 5-Ply Plywood Sample # | Wood Adhesive Sample # | Maple-Fir Bond | Fir-Fir Bond |
|---|---|---|---|
| Day 1 | | | |
| 9.1.1 | 9.3 | Poor | Good |
| 9.1.2 | 9.3 | Good | Good |
| 9.1.3 | 9.3 | Poor | Poor |
| 9.1.4 | 9.3 | Fair | Fair |
| 9.1.5 | 9.4 | Fair | Fair |
| 9.1.6 | 9.4 | Fair | Fair |
| 9.1.7 | 9.4 | Fair | Fair |
| Day 2 | | | |
| 9.2.1 | 9.5 | Fair | Fair |
| 9.2.2 | 9.5 | — | — |
| 9.2.3 | 9.5 | — | — |
| 9.2.4 | 9.6 | — | — |
| 9.2.5 | 9.6 | Fair | Good |
| 9.2.6 | 9.6 | Good | Fair |
| 9.2.7 | 9.7 | Good | Good |
| 9.2.8 | 9.7 | Good | Good |
| 9.2.9 | 9.7 | Good | Good |
| 9.2.10 | 9.1 | Fair | Fair |
| 9.2.11 | 9.2 | Fair | Fair |
| 9.2.12 | 9.2 | Fair | Fair |
| 9.2.13 | 9.2 | Poor | Good |
| 9.2.14 | Comparative Sample 9 | Poor | Fair |
| 9.2.15 | Comparative Sample 9 | Fair | Fair |
| 9.2.16 | Comparative Sample 9 | — | — |

As can be seen in Table 10, 5-Ply Plywood Samples made using the wood adhesive compositions of this invention rated Good to Fair in terms of qualitative dry bond evaluation.

Example 10

Preparation of Stage 3 5-Ply Plywood Samples

In this example 12 inch by 12 inch panels are prepared using the preparation methods similar as described in Example 9 for Samples 9.3-9.5. The wood adhesive compositions used for this Example 10 exhibit a pH of from 10.2 to 10.3 prior to being applied to the veneers. The fir veneers utilized in this Example vary in moisture content from 2% by weight to 12% by weight prior to the wood adhesive compositions being applied. The additional ingredients were utilized as for the manufacture of the 5 ply plywood panels:

- 70/20 SF is a mixture of PDI 70 soy flour available from Cargill, Incorporated having 52% by weight protein, and PDI 20 soy flour available from Cargill, Incorporated having 52% by weight protein, wherein the weight ratio of PDI 70 soy flour to PDI 20 soy flour is 80:20;
- SMBS is sodium meta-bisulfite (a wetting light denaturing agent);
- ChemMod 68 ("CM 68") is neopentylglycol diglycidyl ether available from Cargill, Incorporated;
- 25% NaOH is 25% concentration of sodium hydroxide aqueous solution; and
- Visc cPs is viscosity in centipoise as measured on a RV Brookfield Model DV-II+ utilizing spindle #6, at 10 rpm at a temperature of 75° F.

The 5-ply plywood panel samples are evaluated using the test procedures as described for Example 9. The 5-ply plywood samples are grouped into three groups: (i) Low Moisture refers to 5-ply plywood samples made using fir veneers having from 2 to 4 percent by weight moisture content; (ii) Medium Moisture refers to 5-ply plywood samples made using fir veneers having from 5 to 10 percent by weight moisture content; and (iii) High Moisture refers to 5-ply plywood samples made using fir veneers having greater than 10 percent by weight moisture content. A summary of the typical dry bond and wet soak test results obtained for each of the plywood sample groups is set forth below in Table 11. The descriptors pass, fail, poor, fair and good are determined in the same manner as set forth for Example 9.

TABLE 11

| 5-Ply Plywood Samples | Fir Ply Moisture Content (wt %) | Maple-Fir Bond | Fir-Fir Bond | Pass/Fail Soak Test |
|---|---|---|---|---|
| Low Moisture | 2-4 | Good | Good | Pass* |
| Medium Moisture | 5-10.0 | Good | Good | Pass* |
| High Moisture | >10.0 | Good | Good | Pass* |

This Example 10 and the results in Table 11 show that the 5-ply plywood samples from all three groups typically passed the dry delamination tests. However, as indicated by the *, a higher percentage of Medium Moisture 5-ply plywood samples passed the wet soak test than either the percentage of Low Moisture 5-ply plywood samples or the percentage of Hi Moisture 5-ply plywood samples that passed the wet soak test, when similar manufacturing methods and parameters were utilized for all the samples.

What is claimed:

1. A wood adhesive composition comprising:
   a protein,
   a wetting agent, and
   a poly(glycidyl ether),
   wherein the wood adhesive composition is free of formaldehyde,
   wherein the wood adhesive composition is an aqueous wood adhesive composition comprising from 20 percent by weight to 60 percent by weight dry solids, and
   wherein the pH of the wood adhesive composition is from 8 to 13.

2. The wood adhesive composition of claim 1, wherein a weight ratio of protein to poly(glycidyl ether) is from 9.1:1 to 2.8:1.

3. The wood adhesive composition of claim 1, wherein a weight ratio of protein to poly(glycidyl ether) is from 8:1 to 4:1.

4. The wood adhesive composition of claim 1, wherein the protein is in the form of a protein flour.

5. The wood adhesive composition of claim 4, wherein the protein flour is present in an amount of 50 to 96 percent dry weight of the wood adhesive composition, and the poly(glycidyl ether) is present in an amount of 4 to 50 percent dry weight of the wood adhesive composition.

6. The wood adhesive composition of claim 4, wherein the protein flour is present in an amount of 80 to 96 percent dry weight of the wood adhesive composition, and the poly(glycidyl ether) is present in an amount of 4 to 20 percent dry weight of the wood adhesive composition.

7. The wood adhesive composition of claim 4, wherein the protein flour is derived from soybeans, peas, or mixtures thereof.

8. The wood adhesive composition of claim 1, wherein the protein is in the form of a soy flour comprising from 45 to 55 percent by weight protein.

9. The wood adhesive composition of claim 8, wherein the soy flour has a PDI from 20 to 90.

10. The wood adhesive composition of claim 8, wherein the soy flour has a PDI from 70 to 90.

11. The wood adhesive composition of claim 1, wherein the poly(glycidyl ether) is selected from the group consisting of a linear poly(glycidyl ether), a branched poly(glycidyl ether), a dendritic poly(glycidyl ether), and mixtures thereof.

12. The wood adhesive composition of claim 11, wherein the poly(glycidyl ether) has a molecular weight less than 3,000 dalton.

13. The wood adhesive composition of claim 11, wherein the poly(glycidyl ether) has a molecular weight less than 1,000 dalton.

14. The wood adhesive composition of claim 11, wherein the poly(glycidyl ether) has a molecular weight of at least 174 dalton.

15. The wood adhesive composition of claim 11, wherein the poly(glycidyl ether) is selected from the group consisting of: polypropylene glycol diglycidyl ether, dipropylene glycol diglycidyl ether, trimethylolethane triglycidyl ether, trimethylolpropane triglycidyl ether, 1,4 butanediol diglycidyl ether, neopentylglycol diglycidyl ether, 1,6 hexanediol diglycidyl ether, cyclohexanedimethanol diglycidyl ether, polyglycol triepoxide, and mixtures thereof.

16. The wood adhesive composition of claim 1, wherein the pH of the composition is from 9 to 12.

17. The wood adhesive composition of claim 1, wherein the pH of the composition is from 9.5 to 11.5.

18. A composite wood product made from the wood adhesive composition of claim 1.

19. The composite wood product of claim 18, wherein the composite wood product is selected from the group consisting of plywood, particle board, medium density fiber board, high density fiberboard, oriented strand board, engineered wood flooring, and combinations thereof.

* * * * *